(12) United States Patent
Adolf et al.

(10) Patent No.: US 12,147,739 B2
(45) Date of Patent: Nov. 19, 2024

(54) TECHNIQUES FOR FUSING MULTIPLE LOSS FUNCTIONS IN AN INVERSE DESIGN PROCESS

(71) Applicant: X Development LLC, Mountain View, CA (US)

(72) Inventors: Brian Adolf, San Mateo, CA (US); Martin Schubert, Mountain View, CA (US); Jesse Lu, Hollister, CA (US)

(73) Assignee: X Development LLC, Mountain View, CA (US)

( * ) Notice: Subject to any disclaimer, the term of this patent is extended or adjusted under 35 U.S.C. 154(b) by 769 days.

(21) Appl. No.: 17/402,141

(22) Filed: Aug. 13, 2021

(65) Prior Publication Data
US 2023/0052816 A1 Feb. 16, 2023

(51) Int. Cl.
*G06F 30/20* (2020.01)
*G06F 30/10* (2020.01)
*G06F 119/02* (2020.01)
*G06F 119/18* (2020.01)

(52) U.S. Cl.
CPC .............. *G06F 30/20* (2020.01); *G06F 30/10* (2020.01); *G06F 2119/02* (2020.01); *G06F 2119/18* (2020.01)

(58) Field of Classification Search
CPC .......... G06F 30/00; G06F 30/20; G06F 30/10; G06F 2119/02; G06F 2119/18
USPC .......................................................... 703/6
See application file for complete search history.

(56) References Cited

U.S. PATENT DOCUMENTS

2020/0226221 A1*  7/2020  Lu ...................... G02B 27/0012
2021/0191360 A1*  6/2021  Jones .................... G06F 30/20

FOREIGN PATENT DOCUMENTS

WO    WO-2017049276 A2 *  3/2017  ............. G02B 6/107
WO    WO-2020146526 A1 *  7/2020  ......... G02B 27/0012

OTHER PUBLICATIONS

Piggott, Alexander Y., et al., "Fabrication-constrained nanophotonic inverse design", Scientific Reports, 7: 1786, May 11, 2017, www.nature.com/scientificreports, pp. 1-7.
Vercruysse, Dries, et al., "Analytical level set fabrication constraints for inverse design", Scientific Reports, 9:8999, Jun. 21, 2019, www.nature.com/scientificreports, pp. 1-7.

* cited by examiner

*Primary Examiner* — Cedric Johnson
(74) *Attorney, Agent, or Firm* — Christensen O'Connor Johnson Kindness PLLC

(57) ABSTRACT

In some embodiments, a computer-implemented method for creating a fabricable segmented design for a physical device is provided. A computing system receives a design specification. The computing system generates a proposed segmented design based on the design specification. The computing system determines two or more loss values based on the proposed segmented design. The computing system combines the two or more loss values to create a combined loss value. The computing system creates an updated design specification using the combined loss value. The generating, determining, combining, and creating actions are repeated until a fabricable segmented design is generated.

18 Claims, 12 Drawing Sheets

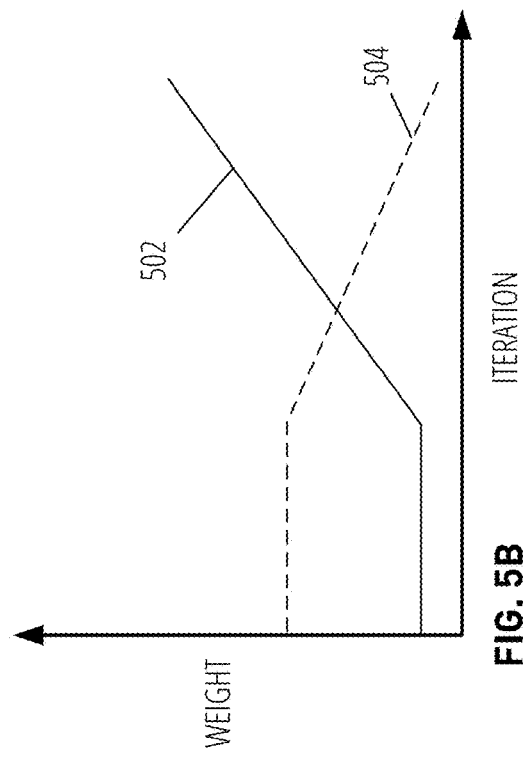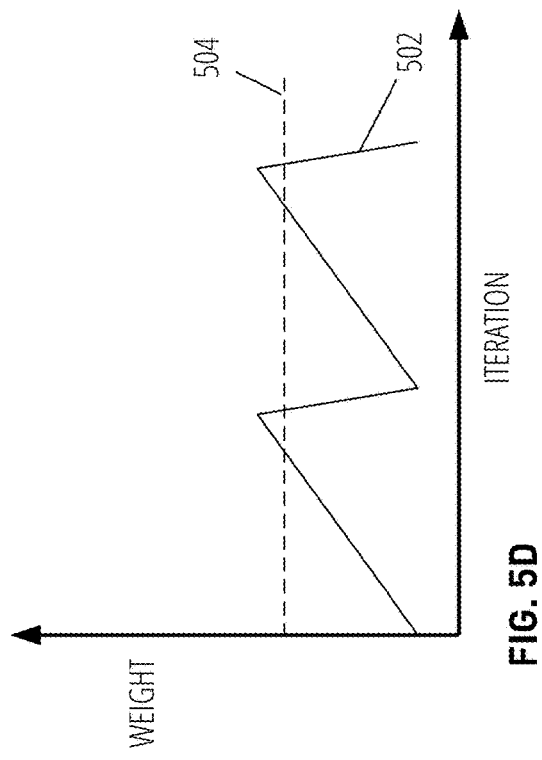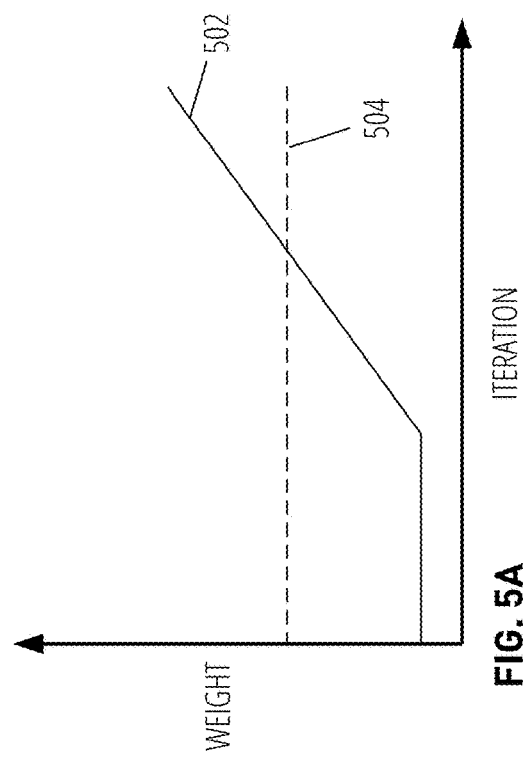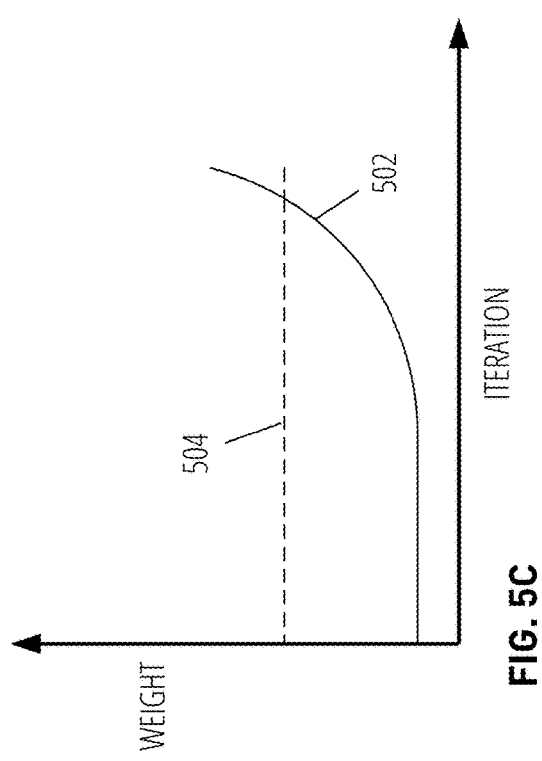

TECHNIQUES FOR FUSING MULTIPLE LOSS FUNCTIONS IN AN INVERSE DESIGN PROCESS

TECHNICAL FIELD

This disclosure relates generally to designing and manufacturing physical devices, and in particular but not exclusively, relates to inverse design of optical and electromagnetic devices.

BACKGROUND

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply generate device designs without considering whether the generated designs can be fabricated. A need exists for techniques for measuring and verifying the fabricability of device designs.

BRIEF SUMMARY

In some embodiments, a non-transitory computer-readable medium is provided. The computer-readable medium has logic stored thereon that, in response to execution by one or more processors of a computing system, causes the computing system to perform actions for creating a fabricable segmented design for a physical device. The actions include receiving, by the computing system, a design specification, generating, by the computing system, a proposed segmented design based on the design specification, determining, by the computing system, two or more loss values based on the proposed segmented design, combining, by the computing system, the two or more loss values to create a combined loss value, creating, by the computing system, an updated design specification using the combined loss value, and repeating at least some of the generating, determining, combining, and creating actions until a proposed segmented design that meets one or more loss thresholds is generated.

In some embodiments, a computer-implemented method for creating a fabricable segmented design for a physical device is provided. A computing system receives a design specification. The computing system generates a proposed segmented design based on the design specification. The computing system determines two or more loss values based on the proposed segmented design. The computing system combines the two or more loss values to create a combined loss value. The computing system creates an updated design specification using the combined loss value. At least some of the generating, determining, combining, and creating actions are repeated until a fabricable segmented design is generated.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 5A to FIG. 5D are charts that illustrate various non-limiting examples of techniques for changing loss value weights over time according to various aspects of the present disclosure.

DETAILED DESCRIPTION

Figure 1A:
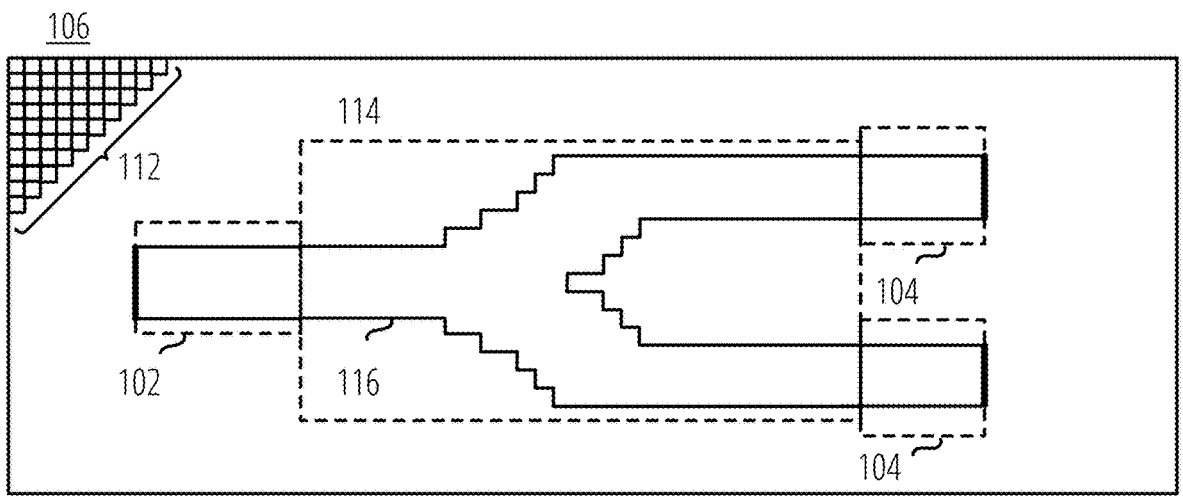
FIG. 1A illustrates a demonstrative simulated environment describing a photonic integrated circuit, in accordance with an embodiment of the present disclosure.
Figure 1B:
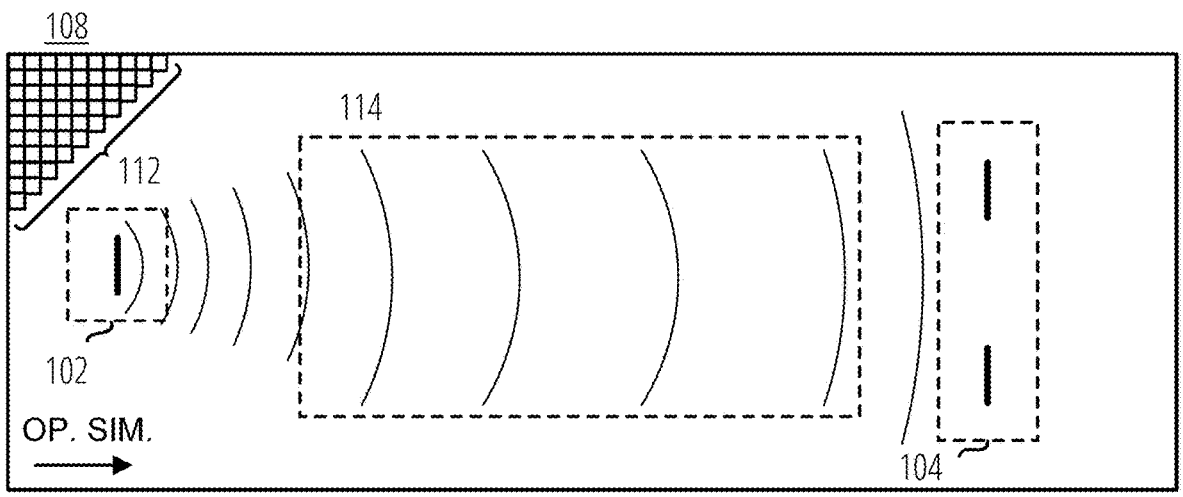
FIG. 1B illustrates an example operational simulation of a photonic integrated circuit, in accordance with an embodiment of the present disclosure.
Figure 1C:
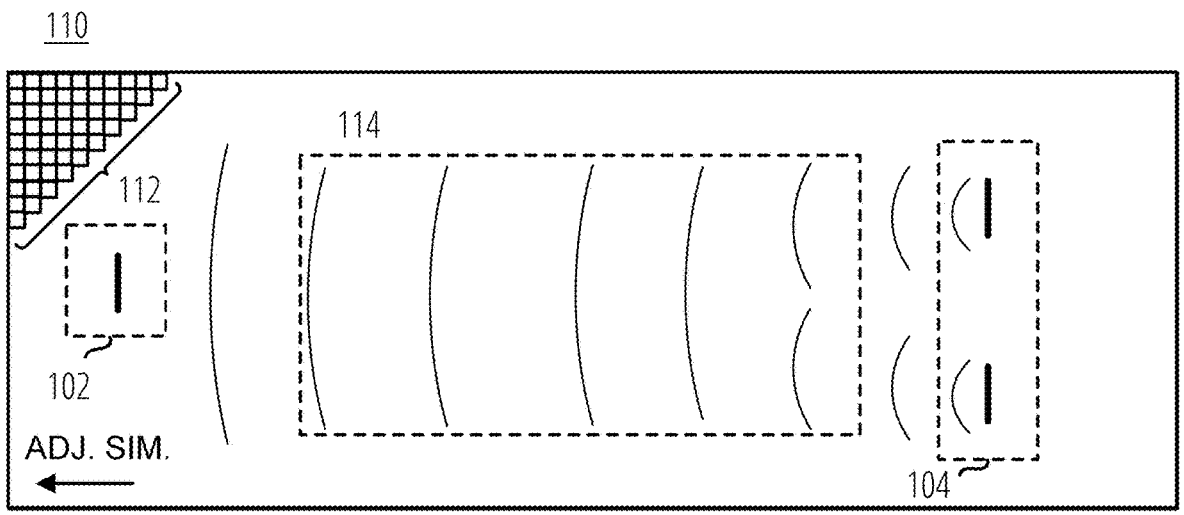
FIG. 1C illustrates an example adjoint simulation within the simulated environment by backpropagating a loss value, in accordance with an embodiment of the present disclosure.

FIG. 1A-FIG. 1C respectively illustrate an initial set up of a simulated environment describing a photonic device, performing an operational simulation of the photonic device in response to an excitation source within a simulated environment, and performing an adjoint simulation of the photonic device within a simulated environment. As illustrated in FIG. 1A-FIG. 1C, simulated environment is represented in two-dimensions. However, it is appreciated that other dimensionality (e.g., 3-dimensional space) may also be used to describe simulated environment and the photonic device. In some embodiments, optimization of structural parameters of the photonic device illustrated in FIG. 1A-FIG. 1C may be achieved via an inverse design process including, inter alia, simulations (e.g., operational simulations and adjoint simulations) that utilize a finite-difference time-domain (FDTD) method to model the field response (e.g., electric and magnetic field) to an excitation source.

FIG. 1A illustrates a demonstrative simulated environment 106 describing a photonic integrated circuit (i.e., a photonic device such as a waveguide, demultiplexer, and the like), in accordance with an embodiment of the present disclosure. More specifically, in response to receiving an initial description of a photonic device defined by one or more structural parameters (e.g., an input design), a system configures a simulated environment 106 to be representative of the photonic device. As illustrated, the simulated environment 106 (and subsequently the photonic device) is described by a plurality of segments 112, which represent individual elements (i.e., discretized) of the two-dimensional (or other dimensionality) space. Each of the segments 112 is illustrated as two-dimensional squares; however, it is appreciated that the segments may be represented as cubes or other shapes in three-dimensional space. It is appreciated that the specific shape and dimensionality of the plurality of segments 112 may be adjusted dependent on the simulated environment 106 and photonic device (or other physical device) being simulated. It is further noted that only a portion of the plurality of segments 112 are illustrated to avoid obscuring other aspects of the simulated environment 106.

Each of the plurality of segments 112 may be associated with a structural value, a field value, and a source value. Collectively, the structural values of the simulated environment 106 describe the structural parameters of the photonic device. In one embodiment, the structural values may correspond to a relative permittivity, permeability, and/or refractive index that collectively describe structural (i.e., material) boundaries or interfaces of the photonic device. For example, an interface 116 is representative of where relative permittivity changes within the simulated environment 106 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of segments 112. Thus, the field response may be based, at least in part, on the structural parameters of the photonic device and the excitation source.

In the illustrated embodiment, the photonic device corresponds to an optical demultiplexer having a design region 114, in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 102 to a corresponding one of the output ports 104. Thus, input port 102 of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 106). In other words, the excitation source may cause the field response of the photonic device to change, which is dependent on the underlying physics governing the physical domain and the structural parameters of the photonic device. The excitation source originates or is otherwise proximate to input port 102 and is positioned to propagate (or otherwise influence the field values of the plurality of segment) through the design region 114 towards output ports 104 of the photonic device. In the illustrated embodiment, the input port 102 and output ports 104 are positioned outside of the design region 114. In other words, in the illustrated embodiment, only a portion of the structural parameters of the photonic device is optimizable.

However, in other embodiments, the entirety of the photonic device may be placed within the design region 114 such that the structural parameters may represent any portion or the entirety of the design of the photonic device. The electric and magnetic fields within the simulated environment 106 (and subsequently the photonic device) may change (e.g., represented by field values of the individual segment that collectively correspond to the field response of the simulated environment) in response to the excitation source. The output ports 104 of the optical demultiplexer may be used for determining a performance metric of the photonic device in response to the excitation source (e.g., power transmission from input port 102 to a specific one of the output ports 104). The initial description of the photonic device, including initial structural parameters, excitation source, performance parameters or metrics, and other parameters describing the photonic device, may be received by a system and used to configure the simulated environment 106 for performing a first-principles based simulation of the photonic device. These specific values and parameters may be defined directly by a user, indirectly (e.g., by a system culling pre-determined values stored in a memory, local storage, or remote resources), or a combination thereof.

FIG. 1B illustrates an operational simulation of the photonic device in response to an excitation source within simulated environment 108, in accordance with various aspects of the present disclosure. In the illustrated embodiment, the photonic device is an optical demultiplexer structured to optically separate each of a plurality of distinct wavelength channels included in a multi-channel optical signal received at input port 102 and respectively guide each of the plurality of distinct wavelength channels to a corresponding one of the plurality of output ports 104. The excitation source may be selected (randomly or otherwise)

from the plurality of distinct wavelength channels and originates at input port 102 having a specified spatial, phase, and/or temporal profile. The operational simulation occurs over a plurality of time steps, including the illustrated time step. When performing the operational simulation, changes to the field response (e.g., the field value) for each of the plurality of segments 112 are incrementally updated in response to the excitation source over the plurality of time steps. The changes in the field response at a particular time step are based, at least in part, on the structural parameters, the excitation source, and the field response of the simulated environment 110 at the immediately prior time step included in the plurality of time steps. Similarly, in some embodiments the source value of the plurality of segments 112 is updated (e.g., based on the spatial profile and/or temporal profile describing the excitation source). It is appreciated that the operational simulation is incremental and that the field values (and source values) of the simulated environment 110 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In some embodiments, the performance metric corresponds to the power transmission at a corresponding one of the output ports 104 mapped to the distinct wavelength channel being simulated by the excitation source. In other words, in some embodiments, the performance metric represents power (at one or more frequencies of interest) in the target mode shape at the specific locations of the output ports 104. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric). It is noted that the loss metric may be further based on a fabrication loss value that is utilized to enforce a minimum feature size or other fabricability constraints of the photonic device to promote fabricability of the device.

FIG. 1C illustrates an example adjoint simulation within simulated environment 110 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 104) or other location that corresponds to a location used when determining the performance metric. The adjoint source(s) is then treated as a physical stimuli or an excitation source during the adjoint simulation. A loss response of the simulated environment 110 is computed for each of the plurality of time steps (e.g., backwards in time) in response to the adjoint source. The loss response collectively refers to loss values of the plurality of segment that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performed while maintaining fabricability.

Figure 2:
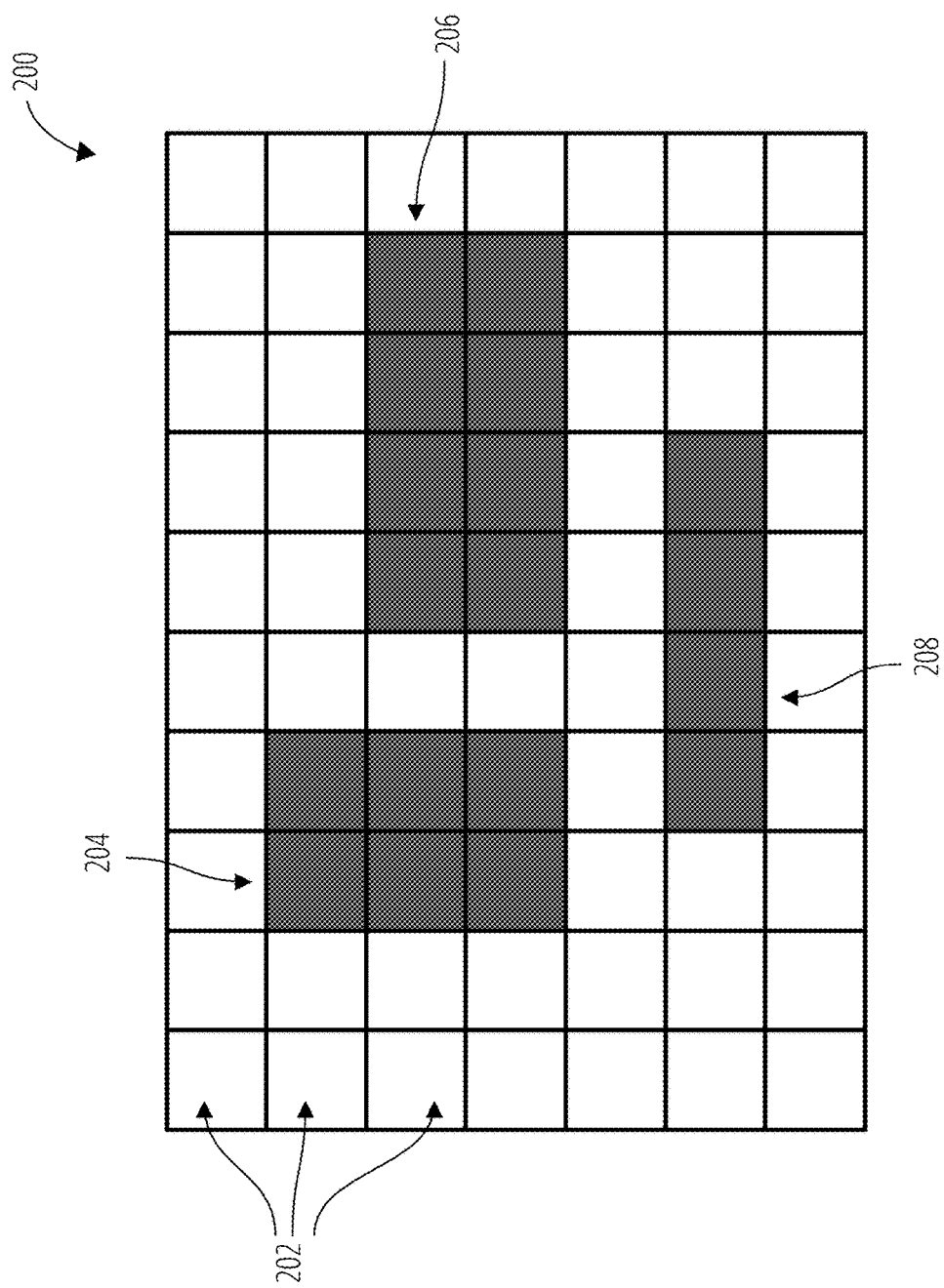
FIG. 2 is a schematic drawing that illustrates a non-limiting example embodiment of a segmented design according to various aspects of the present disclosure.

FIG. 2 is a schematic drawing that illustrates a non-limiting example embodiment of a segmented design according to various aspects of the present disclosure. The segmented design 200 is a non-limiting example of content suitable for insertion in the design region 114 described above (though not drawn to the scale or with the same granularity of segmentation). As shown, the segmented design 200 includes a plurality of segments 202 laid out in a two-dimensional grid. Each of the segments 202 represents a location in the proposed segmented design that can either include a material or not include a material. As illustrated, segments that are white indicate a lack of the material, and segments that are dark (such as the first pattern 204, the second pattern 206, and the third pattern 208, indicate a presence of the material. For example, in a photolithography process, segments that are white may represent locations that are not exposed, and segments that are dark may represent locations that are exposed during the photolithography process. As another example, in an additive manufacturing process (e.g., a 3-D printer), segments that are white may represent locations that do not include material, and segments that are dark may represent locations that do include material.

This description is a non-limiting example only, and in some embodiments, the white and dark segments may have another meaning within the segmented design 200. In some embodiments, the segmented design 200 may include more than two colors. For example, a white segment may indicate a lack of material, a segment in a first color may indicate presence of a first material, and a segment in a second color may indicate a presence of a second material. In some embodiments, the segmented design 200 may be three-dimensional or one-dimensional, instead of the two-dimensional segmented design 200 illustrated in FIG. 2.

Typically, a fabrication system can duplicate any segmented design provided to it, subject to certain constraints. For example, a minimum feature size, a minimum feature shape, or any other constraint may be specified by the fabrication system as limitations on the segmented designs that the fabrication system can fabricate. From these constraints, a "paintbrush pattern" can be determined. In some embodiments, the paintbrush pattern represents a smallest feature that can be generated by a given fabrication system. If a given segmented design can be created by tiling the paintbrush pattern over the segmented design, then the segmented design is fabricable using the associated fabrication system. If one or more portions of the segmented design cannot be drawn with the paintbrush pattern, then the segmented design is not fabricable using the associated fabrication system. In some embodiments, if a fabrication system can fabricate devices with more than one material, separate constraints (and therefore separate paintbrush patterns) may be provided for each different material.

Figure 3:
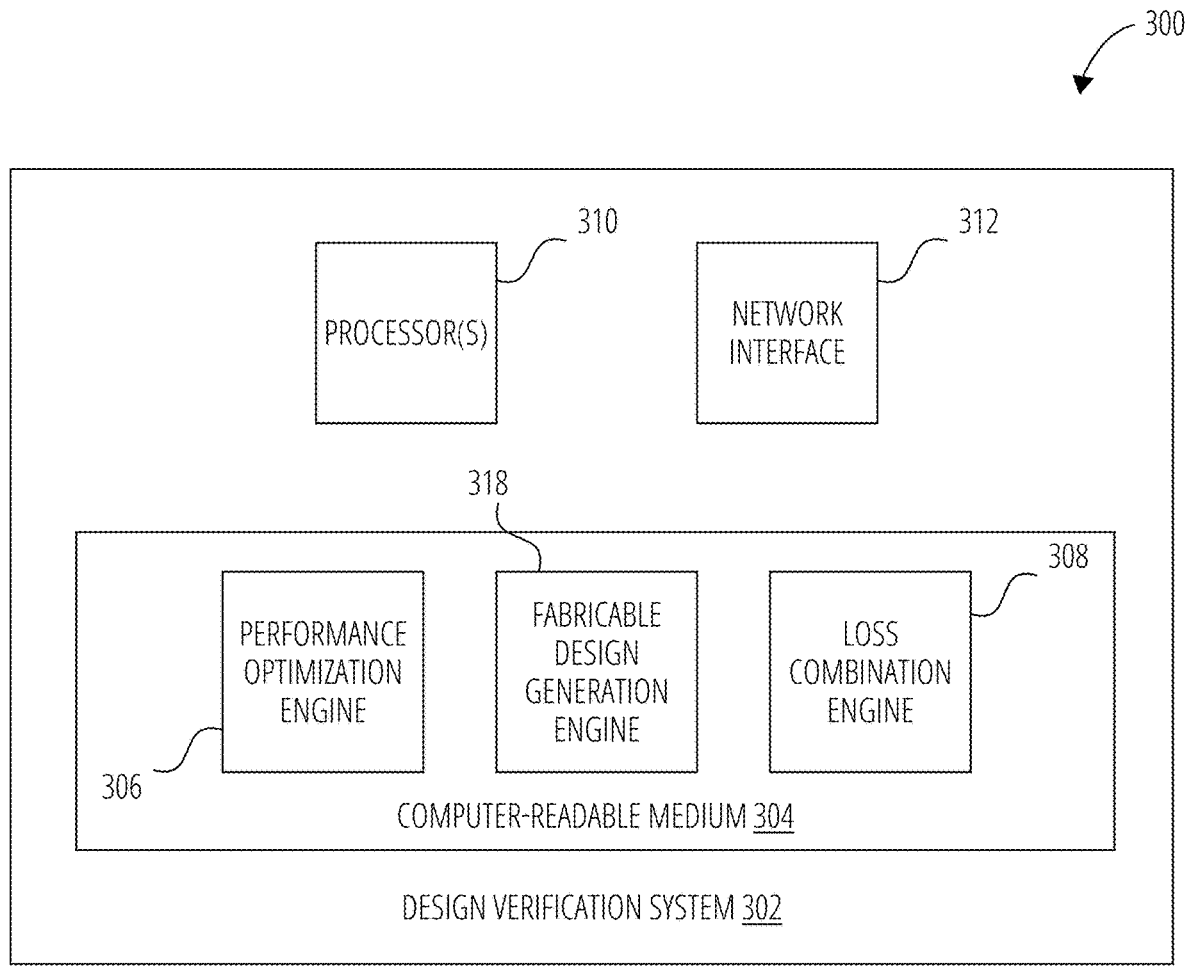
FIG. 3 is a block diagram that illustrates a non-limiting example embodiment of a system according to various aspects of the present disclosure.

FIG. 3 is a block diagram that illustrates a non-limiting example embodiment of a system according to various aspects of the present disclosure. Overall, the illustrated embodiment of the computing system 300 is configured to generate design specifications, to determine fabricable segmented designs based on the design specifications, and to fabricate physical devices based on the fabricable segmented designs.

Typically, performance of the segmented designs generated by the computing system 300 is improved using an inverse design process as discussed above (or another process). Sometimes, using such an inverse design process to generate performant segmented designs is based on a performance loss, and is initially unconstrained by consideration of fabricability. While this can result in designs that are theoretically highly performant, it also often results in designs that cannot be fabricated due to physical limitations of the fabrication system to be used and/or the materials that make up the design. Accordingly, it is desirable to consider multiple different types of loss, including but not limited to performance loss and fabrication loss, while optimizing segmented designs.

As shown, the computing system 300 includes a design generation system 314, a fabrication system 316, and a design verification system 302. Communication between the design generation system 314, the design verification system 302, and the fabrication system 316 may occur via a network (not pictured), via exchange of a removable computer-readable medium (not pictured), or via any other suitable technique. Though the design generation system 314, fabrication system 316, and design verification system 302 are illustrated as separate systems, in some embodiments, some portions of these systems may be combined. As one non-limiting example, the design generation system 314 and the design verification system 302 may be combined in a single system. Also, in some embodiments, systems illustrated in FIG. 3 as a single system may be broken into multiple systems.

In some embodiments, the design generation system 314 may include one or more computing devices that are configured to generate design specifications for segmented designs that achieve a desired result. For example, the design generation system 314 may use forward simulation and backpropagation techniques to generate a segmented design for an electromagnetic device (or any other type of physical device) that has desired characteristics. This is a non-limiting example only, and any other technique, including but not limited to manual design, may be used by the design generation system 314 to create design specifications.

In some embodiments, the fabrication system 316 may be any suitable system for fabricating a segmented design. In some embodiments, the fabrication system 316 may be a photolithography system or an additive manufacturing system. In some embodiments, the fabrication system 316 may have characteristics that include a minimum feature size, a minimum feature shape, and/or other constraints that help define the segmented designs that the fabrication system 316 is capable of fabricating. To that end, the fabrication system 316 may provide a design rule checker that is configured to process proposed segmented designs to determine whether the proposed segmented designs comply with the constraints of the fabrication system 316. The design rule checker may be used to determine one or more paintbrush patterns that represent patterns embody the minimum feature size and/or minimum feature shape fabricable by the fabrication system 316.

In some embodiments, the design verification system 302 may be any suitable computing device or collection of computing devices configured to provide the described functionality. In some embodiments, the design verification system 302 may be a server computing device, a desktop computing device, a laptop computing device, a mobile computing device, a tablet computing device, or one or more computing devices of a cloud computing system.

As shown, the design verification system 302 includes one or more processors 310, a network interface 312, and a computer-readable medium 304. In some embodiments, the one or more processors 310 may include a plurality of processors and/or a plurality of processing cores in order to provide a large amount of computing power. In some embodiments, the network interface 312 may be configured to communicate with the design generation system 314 and/or the fabrication system 316 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 312, the design verification system 302 may be configured to communicate with the design generation system 314 and/or the fabrication system 316 via transfer of a removable computer-readable medium (not shown).

As shown, the computer-readable medium 304 has stored thereon logic that, in response to execution by the one or more processors 310, cause the design verification system 302 to provide a performance optimization engine 306, a fabricable design generation engine 318, and a loss combination engine 308.

In some embodiments, the performance optimization engine 306 is configured to generate proposed segmented designs based on design specifications received from the design generation system 314. Typically, the performance optimization engine 306 uses an inverse design process that includes optimizing a performance loss value to generate the proposed segmented designs. In some embodiments, the performance optimization engine 306 may also optimize segmented designs using other loss values, including but not limited to a fabrication loss value, and combinations thereof.

In some embodiments, the fabricable design generation engine 318 is configured to generate one or more fabricable segmented designs based on a given proposed segmented design that may or may not be fabricable. If the given proposed segmented design is already fabricable, then the fabricable design generation engine 318 may not make any changes. However, if the given proposed segmented design is not fabricable, then the fabricable design generation engine 318 may use a technique described below to remove unfabricable portions, thereby "snapping" the unfabricable proposed segmented design to a fabricable segmented design.

In some embodiments, the loss combination engine 308 is configured to combine two or more loss values for a segmented design, determine a gradient of the combined loss value, and provide the gradient to the performance optimization engine 306 to optimize the segmented design.

Further details of the configuration of the performance optimization engine 306, the fabricable design generation engine 318, and the loss combination engine 308 are provided below.

As used herein, "engine" refers to logic embodied in hardware or software instructions, which can be written in a programming language, such as C, C++, C#, COBOL, JAVA™, PHP, Perl, HTML, CSS, JavaScript, VBScript, ASPX, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Figure 4:
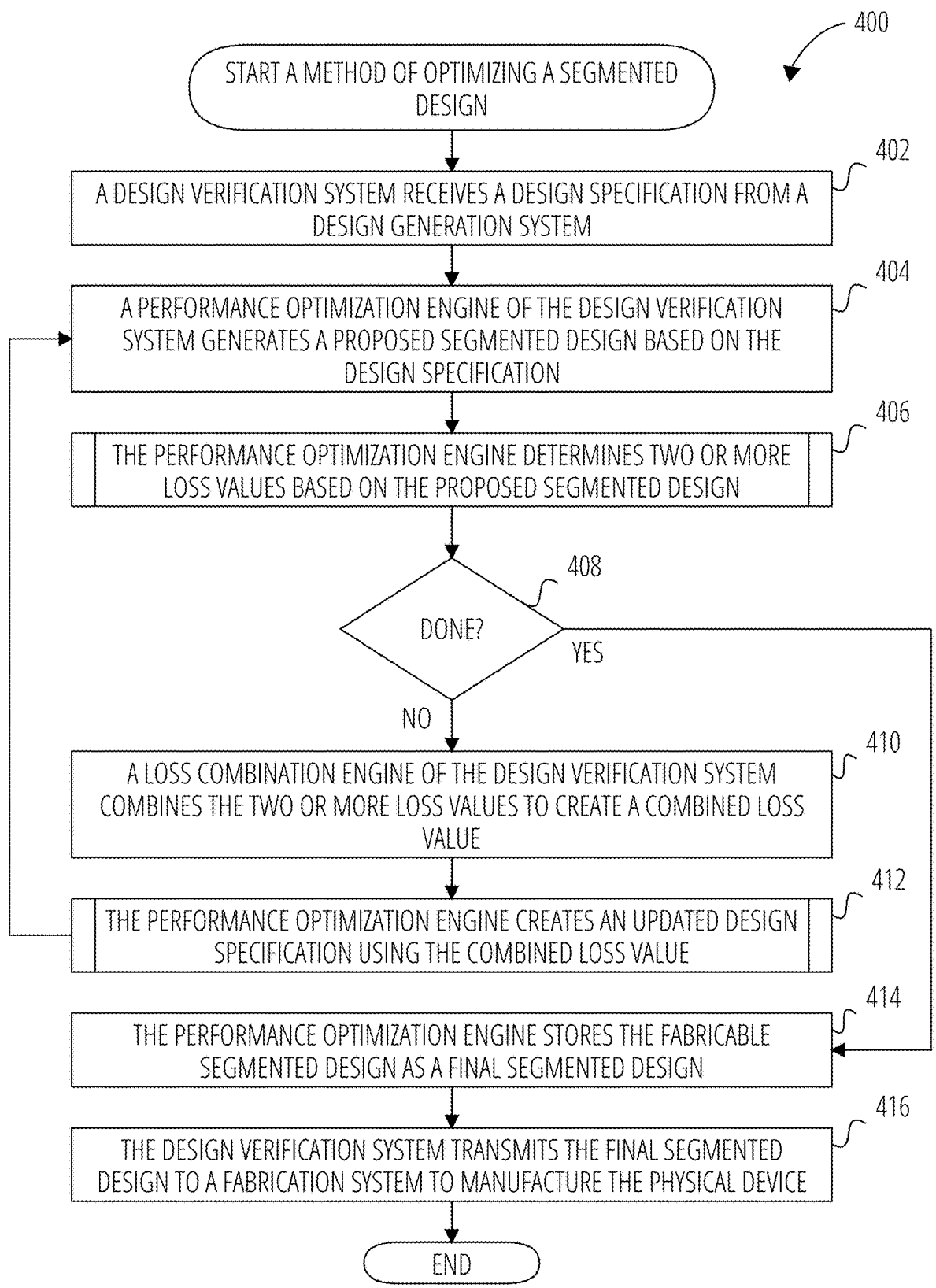
FIG. 4 is a flowchart that illustrates a non-limiting example embodiment of a method of optimizing a segmented design according to various aspects of the present disclosure

FIG. 4 is a flowchart that illustrates a non-limiting example embodiment of a method of optimizing a segmented design according to various aspects of the present disclosure. In embodiments of the method 400, two or more loss values are fused in order to optimize the segmented design to achieve multiple goals. Typically, the goals may include a performance goal and a fabricability goal. That is, the optimization process may aim to provide a segmented design that is both performant and is fabricable. Though loss values representing these two goals may typically be used, in some embodiments, more loss values and/or different loss values may be used without departing from the scope of the present disclosure.

From a start block, the method 400 proceeds to block 402, where a design verification system 302 receives a design specification from a fabrication system 316. In some embodiments, the design specification may include a segmented design generated randomly, generated using a naïve optimization technique, using a technique similar to those used by the performance optimization engine 306, generated manually, or generated using any other suitable technique. In some embodiments, the design specification may include a linear function that represents a desired characteristic of the physical device, instead of specifying a segmented design. In some embodiments, the design specification may also include an indication of the desired performance characteristics of the physical device. For example, the design specification may include a performance loss function to be used to evaluate the performance of segmented designs during optimization. As another example, the design specification may include one or more parameters, including but not limited to desired input and/or output wavelengths, to be used by a performance loss function built into the performance optimization engine 306.

At block 404, a performance optimization engine 306 of the design verification system 302 generates a proposed segmented design. Any suitable technique may be used by the performance optimization engine 306 to generate the proposed segmented design based on the design specification. As one non-limiting example, the forward-simulation/backpropagation technique described above in FIG. 1A-FIG. 1C may be used to create a proposed segmented design based on the design specification. In other examples, other techniques, including but not limited to other generative design techniques, genetic design techniques, or still other techniques may be used.

Figure 11:
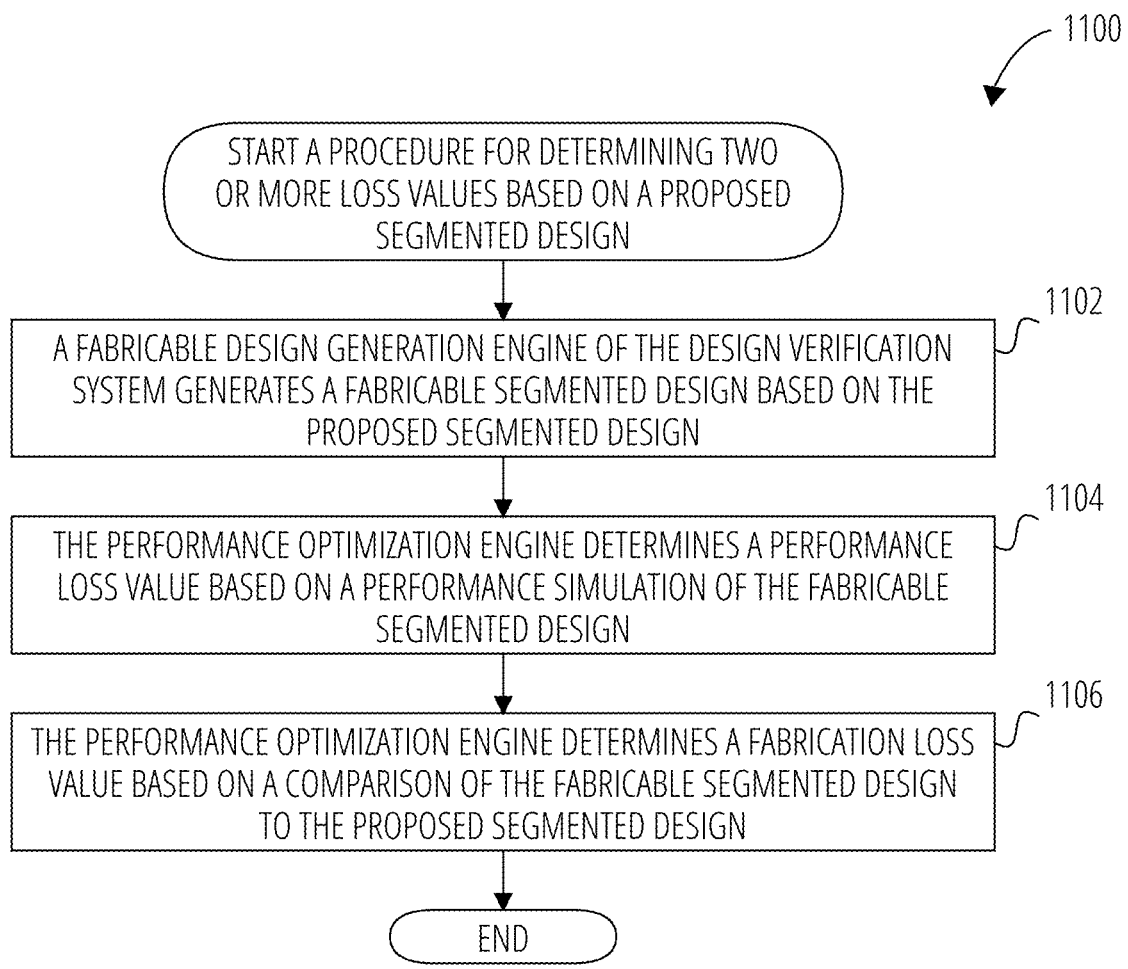
FIG. 11 is a flowchart that illustrates a non-limiting example embodiment of a procedure for determining two or more loss values based on a proposed segmented design according to various aspects of the present disclosure.

At subroutine block 406, a procedure is executed wherein the performance optimization engine 306 determines two or more loss values based on the proposed segmented design. Any suitable procedure that determines any suitable loss values may be used. One non-limiting example of a procedure that generates a performance loss value and a fabrication loss value is illustrated in FIG. 11 and described in detail below.

The method 400 then proceeds to decision block 408, where a determination is made regarding whether the process for generating the segmented design is done. In some embodiments, the process may be done after the proposed segmented design meets one or more loss value thresholds. Any suitable loss value thresholds may be used to determine whether the process is done. For example, the method 400 may determine whether a performance loss value meets a predetermined performance loss threshold that indicates a desired level of simulated performance of the proposed segmented design. The method 400 may also determine whether a fabrication loss value is below a predetermined fabrication loss threshold that indicates whether the proposed segmented design is fabricable. In some embodiments, the fabrication loss threshold may indicate that there is zero fabrication loss, such that there are no portions of the proposed segmented design that are not fabricable by the fabrication system 316. In some embodiments, other factors may be considered to determine whether the process for generating the segmented design is done, including but not limited to whether a predetermined number of optimization iterations have been completed.

If it is determined that the fabricable segmented design does not meet the one or more loss value thresholds, then the result of decision block 408 is NO, and the method 400 proceeds to block 410, where a loss combination engine 308 of the design verification system 302 combines the two or more loss values to create a combined loss value.

In some embodiments, a simple combination of the two or more loss values may be performed. However, a naïve combination of the two or more loss values may result in suboptimal behaviors. For example, simply combining the two or more loss values may result in the optimization process becoming stuck in a local minimum of one or more of the loss functions. If that were to happen when combining a performance loss value and a fabrication loss value, the process could result in a highly performant segmented design that cannot be optimized into fabricability due to becoming stuck in a local minimum of the fabrication loss function that is not fabricable, or could result in a fabricable segmented design with low performance due to becoming stuck in a local minimum of the performance loss function.

In some embodiments, weights may be applied to each of the two or more loss values to be combined. In order to avoid undesirable local minima of any given loss value, the weights may be dynamically changed in order to escape local minima and end up at an overall improved segmented design based on multiple loss values. When using a performance loss value and a fabrication loss value, this means that the resulting segmented design will be both highly performant and fabricable.

In some embodiments, the weights for each of the loss values may be changed over time based on an iteration number of the optimization process. That is, the weights may be determined based on a value associated with an iteration number incremented by the method 400 after subroutine block 412 (described below).

Many different techniques may be used to alter the weights based on the iteration number. FIG. 5A to FIG. 5D are charts that illustrate various non-limiting examples of techniques for changing loss value weights over time according to various aspects of the present disclosure. In each chart, the iteration number is illustrated on the horizontal axis, and a weight value is illustrated on the vertical axis. Neither axis is necessarily to scale, but instead shows the general relationships between the illustrated weights as the iteration number increases.

In FIG. 5A, a performance loss weight 504 is held constant in order to provide a consistent push toward highly performant designs. As the iteration number increases, however, eventually a fabrication loss weight 502 begins to increase steadily. By using such a technique, the optimization may initially push toward a highly performant design whether or not the design is fabricable, and then, once a neighborhood of a highly performant design is established, fabricability is given more importance in order to eventually arrive at a fabricable design. FIG. 5B follows a similar strategy, but instead of just increasing the fabrication loss weight 502, the performance loss weight 504 is also reduced. This technique can provide an even greater push toward fabricable designs. FIG. 5C follows yet another similar strategy, but indicates that instead of varying linearly as a function of the iteration number, the weights (such as the illustrated fabrication loss weight 502) may be varied exponentially. In some embodiments, the weights may be varied by multiplying the weight by the iteration number or by any other function based on the iteration number.

In FIG. 5D, a more complex schedule for the variation of the fabrication loss weight 502 is provided. In FIG. 5D, the fabrication loss weight 502 rises and falls over time in a recurring pattern. By providing oscillating amounts of weight to the fabrication loss weight 502, the optimization process can get bumped out of local minima of the fabrication loss function by allowing the performance loss value to periodically dominate.

Figure 6:
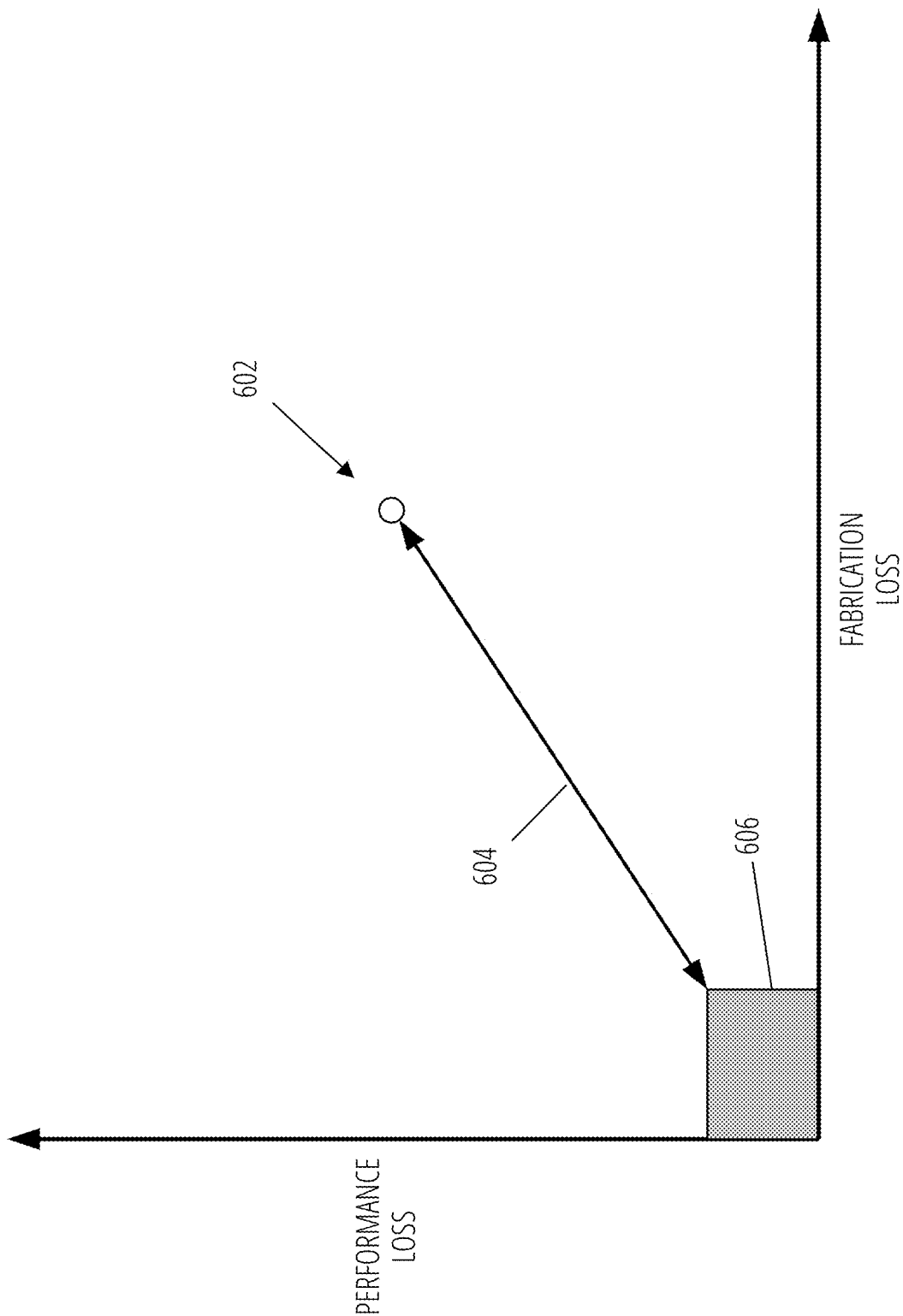
FIG. 6 is a chart that illustrates a non-limiting example embodiment of a technique for changing loss value weights based on a function of at least one of the loss values according to various aspects of the present disclosure.

In some embodiments, the total loss may be a nonlinear function of the individual losses. FIG. 6 is a chart that illustrates a non-limiting example embodiment of a technique for combining losses according to various aspects of the present disclosure. In FIG. 6, performance loss is illustrated on a vertical axis, and fabrication loss is illustrated on a horizontal axis. The performance loss value and the fabrication loss value are plotted as a loss value point 602. A target loss area 606 is illustrated as a location on the chart in which, if the loss values fell, the loss values would meet their associated thresholds. A distance 604 between the loss value point 602 and the target loss area 606 is determined, and this distance 604 (or, for example, a square of this distance) is used to determine the weights for the performance loss value and the fabrication loss value. In some embodiments, the distance 604 is determined as the Euclidean distance from the loss value point 602 to the target loss area 606.

Figure 7:
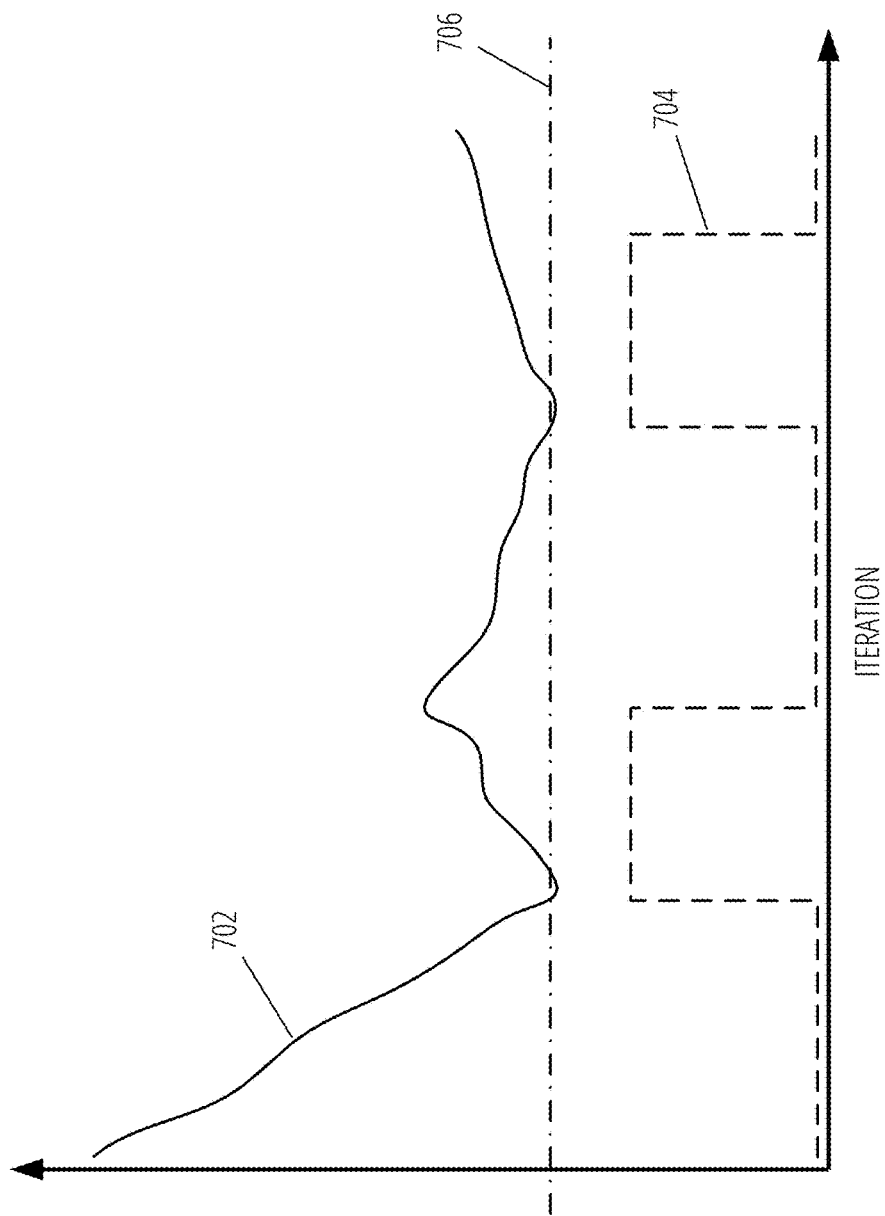
FIG. 7 is a chart that illustrates a non-limiting example embodiment of another technique for changing loss value weights based on a function of at least one of the loss values according to various aspects of the present disclosure.

FIG. 7 is a chart that illustrates a non-limiting example embodiment of another technique for changing loss value weights based on a function of at least one of the loss values according to various aspects of the present disclosure. In FIG. 7, the fabrication loss weight 704 is determined in part as a function of the performance loss value 702. As shown, the fabrication loss weight 704 is kept low until the performance loss value 702 is reduced below a threshold value 706. Once the performance loss value 702 reaches the threshold value 706, the fabrication loss weight 704 is raised for a predetermined number of iterations in order to drive the segmented design toward a fabricable segmented design. As such, the performance loss value 702 begins to increase again due to the temporary prioritization of fabricability over performance. After the predetermined number of iterations, the fabrication loss weight 704 returns to a low value, and the performance loss value 702 again begins to fall. FIG. 7 illustrates a second occurrence of the performance loss value 702 reaching the threshold value 706, and the fabrication loss weight 704 again being temporarily raised. By using this technique, the segmented design can be pushed away from potential designs that may be performant but are unlikely to be close to fabricable designs. In some embodiments, instead of a predetermined number of iterations, the fabrication loss weight 704 may be raised until the performance loss value 702 reaches another threshold value, or until any other suitable condition is detected.

Figure 8:
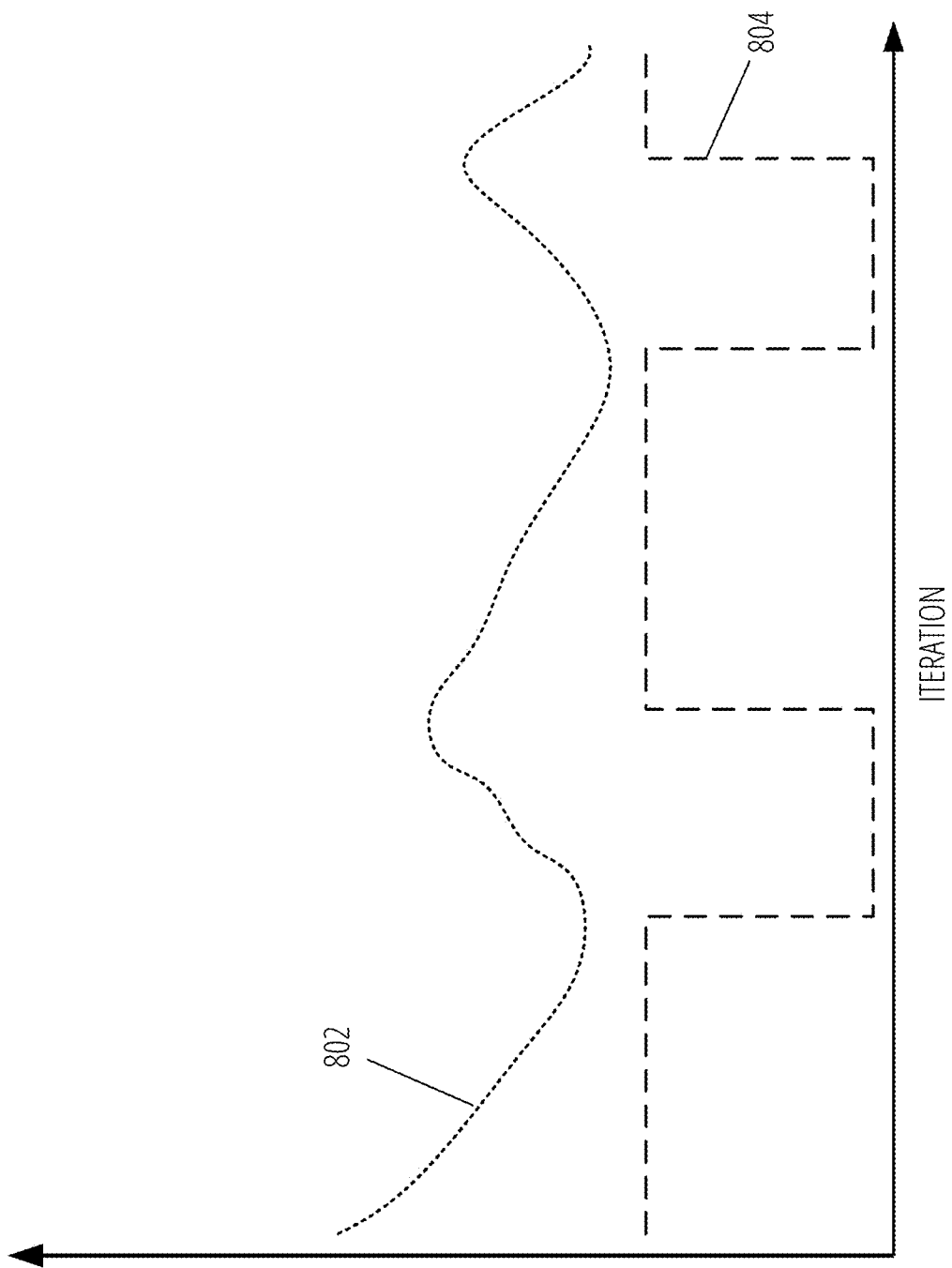
FIG. 8 is a chart that illustrates a non-limiting example embodiment of yet another technique for changing loss value weights based on a function of at least one of the loss values according to various aspects of the present disclosure.

FIG. 8 is a chart that illustrates a non-limiting example embodiment of yet another technique for changing loss value weights based on a function of at least one of the loss values according to various aspects of the present disclosure. In FIG. 8, the fabrication loss weight 804 is determined as a function of the fabrication loss value 802. More specifically, the fabrication loss weight 804 is determined in part on the slope of the plot of the fabrication loss value 802 (in other words, on the derivative of the plot of the fabrication loss value 802). When it is determined that the slope of the plot of the fabrication loss value 802 reaches zero, the fabrication loss weight 804 is reduced from a high value to a low value for a predetermined number of iterations. After the predetermined number of iterations, the fabrication loss weight 804 is returned to the high value. When the slope of the plot of the fabrication loss value 802 is zero, it indicates that the fabrication loss value 802 has found a local minimum. By temporarily reducing the fabrication loss weight 804 when the slope is zero, other loss values (such as the performance loss value) may have greater influence on the segmented design, and the optimization may be influenced outside of the local minimum of the fabrication loss value 802. This result is similar to simulated annealing, in which a design is randomly perturbed in order to escape local minima of a loss function. In some embodiments, instead of a predetermined number of iterations, the fabrication loss weight 804 may be returned to the high value after the fabrication loss value 802 reaches a threshold value, or after any suitable condition is detected.

Figure 9:
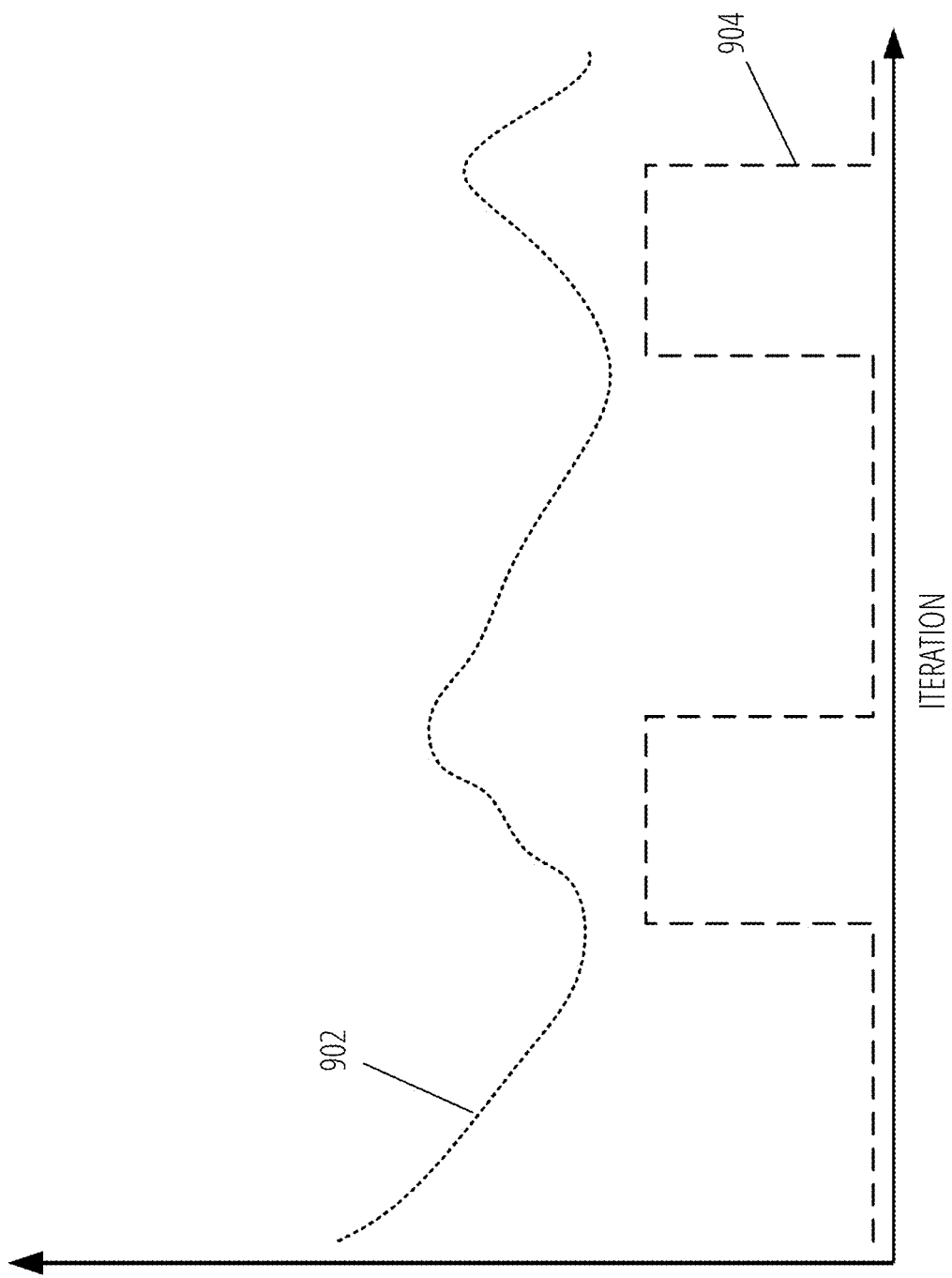
FIG. 9 is a chart that illustrates a non-limiting example embodiment of still another technique for changing loss value weights based on a function of at least one of the loss values according to various aspects of the present disclosure.

FIG. 9 is a chart that illustrates a non-limiting example embodiment of still another technique for changing loss value weights based on a function of at least one of the loss values according to various aspects of the present disclosure. The technique used in FIG. 9 is similar to that used in FIG. 8, in that a fabrication loss weight 904 is determined based on a slope of a plot of a fabrication loss value 902. However, in FIG. 9, instead of decreasing the fabrication loss weight 904 when the slope of the plot of the fabrication loss value 802 is zero, the fabrication loss weight 804 is increased. This is an example of another way of specifying the gradients which may have a similar effect as the other techniques but through application of a different mechanism.

Figure 10:
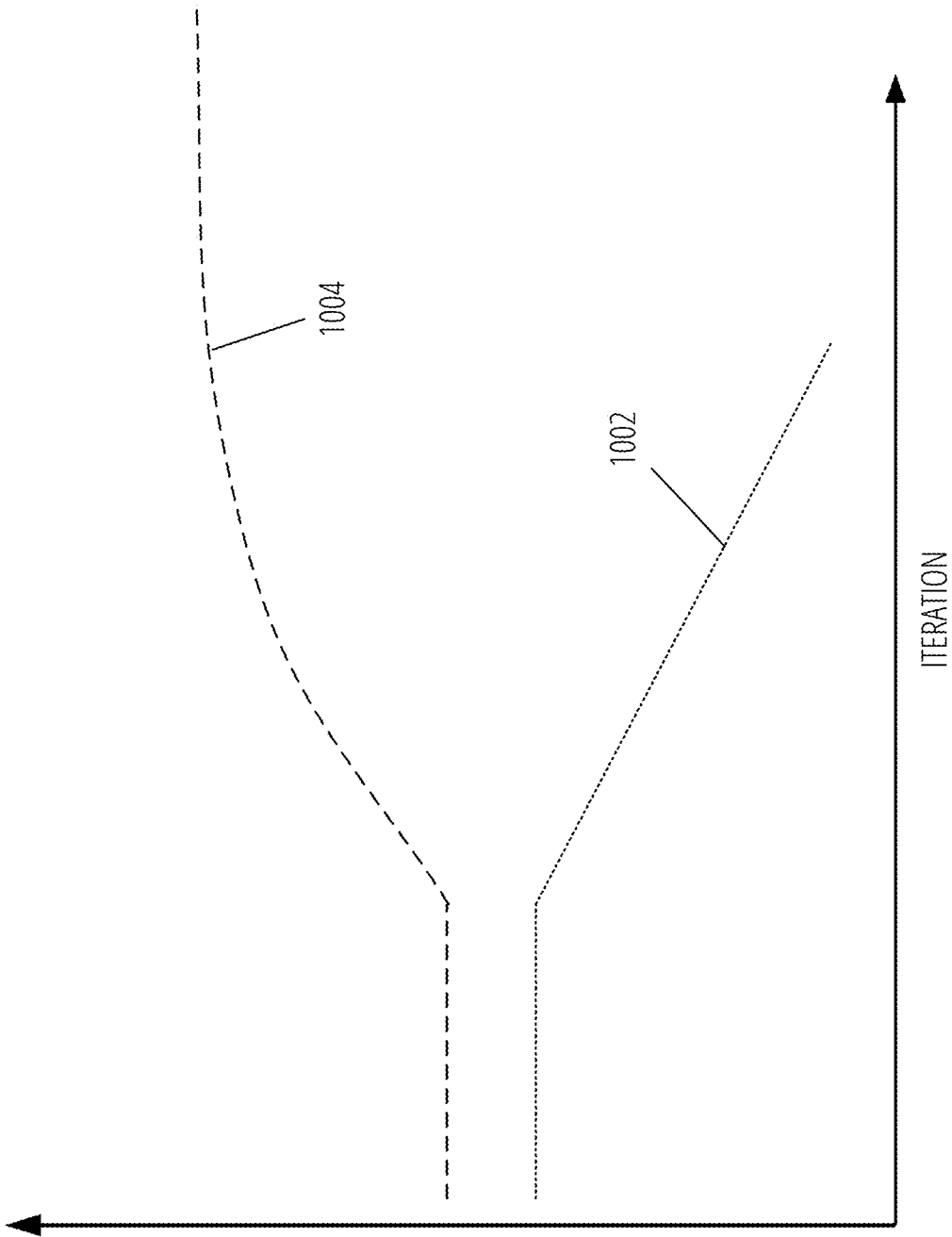
FIG. 10 is a chart that illustrates a non-limiting example embodiment of yet another technique for changing loss value weights based on a function of at least one of the loss values according to various aspects of the present disclosure.

FIG. 10 is a chart that illustrates a non-limiting example embodiment of yet another technique for changing loss value weights based on a function of at least one of the loss values according to various aspects of the present disclosure. In FIG. 9, a fabrication loss weight 1004 is initially held constant. Then, at a certain iteration, a feedback controller is activated to control the fabrication loss weight 1004. An error term is calculated by determining a difference between the fabrication loss value 1002 and a desired threshold value (e.g., zero). This error term is then used to adjust the fabrication loss weight 1004. In the illustrated embodiment, an integral of the error term is determined, and this integral value is used to adjust the fabrication loss weight 1004. In some embodiments, additional computations, such as a proportional value (the instantaneous difference between the error term and the threshold value) and/or a derivative value (the rate of change of the error term) may be used to adjust the fabrication loss weight 1004 along with or instead of the integral term.

Figure 12:
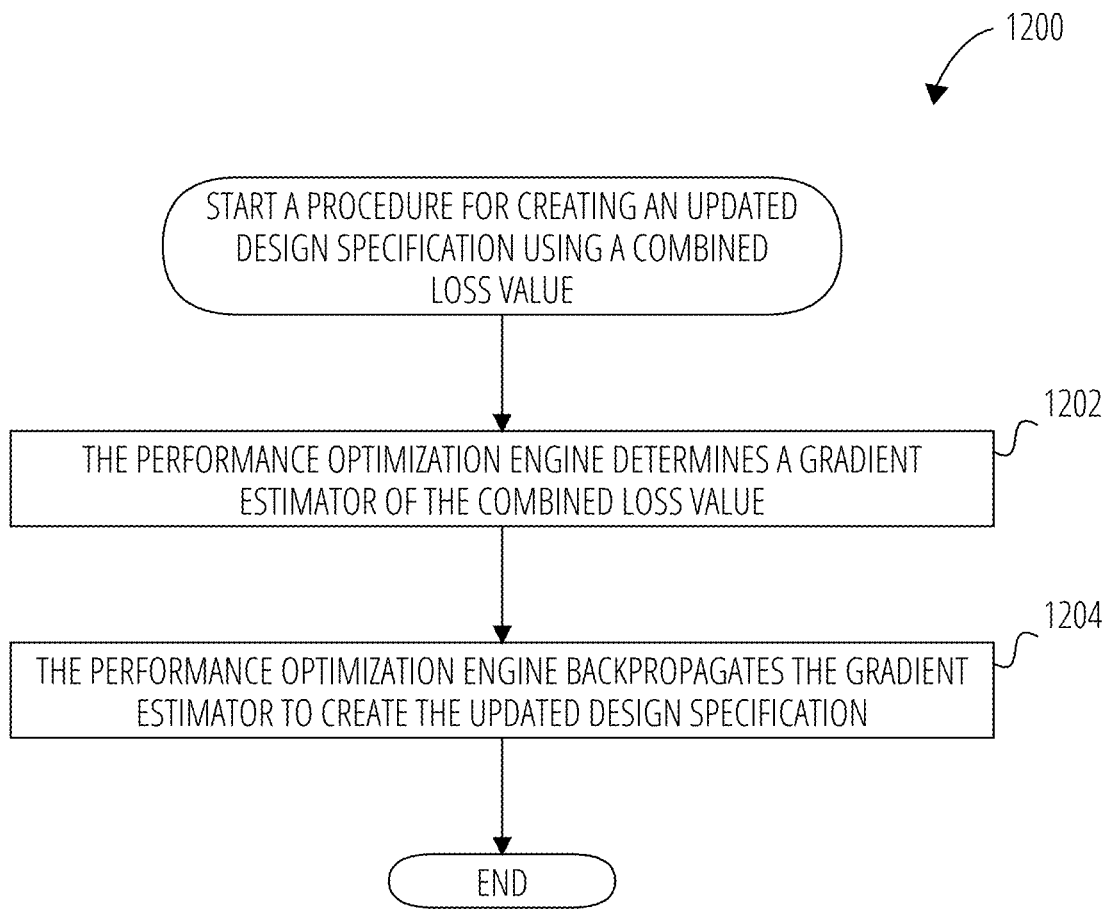
FIG. 12 is a flowchart that illustrates a non-limiting example embodiment of a procedure for creating an updated design specification using a combined loss value according to various aspects of the present disclosure.

Returning to FIG. 4, after block 410, the method 400 proceeds to subroutine block 412, where a procedure is executed wherein the performance optimization engine 306 creates an updated design specification using the combined loss value. Any suitable technique may be used to create the updated design specification using the combined loss value. One non-limiting example embodiment of such a technique is illustrated in FIG. 12 and described in detail below.

The method 400 then returns to block 404 to optimize the updated design specification. In some embodiments, the method 400 may increment an iteration number upon returning to block 404. The iteration number may be used by various parts of the method 400, including but not limited to the technique used for combining the two or more loss values to create the combined loss value at block 410.

Returning to decision block 408, if it is determined that the proposed segmented design does meet the one or more loss value thresholds, then the result of decision block 408 is YES, and the method 400 proceeds to block 414. At block 414, the performance optimization engine 306 stores the fabricable segmented design as a final segmented design, and at block 416, the design verification system 302 transmits the final segmented design to a fabrication system 316 to manufacture the physical device. The method 400 then proceeds to an end block and terminates.

FIG. 11 is a flowchart that illustrates a non-limiting example embodiment of a procedure for determining two or more loss values based on a proposed segmented design according to various aspects of the present disclosure. In the illustrated embodiment, a fabrication loss value and a performance loss value are determined. In other embodiments, additional and/or different loss values may be determined. While the procedure 1100 is an example of a procedure that is suitable for use at subroutine block 406 of the method 400 illustrated and described above, one will note that this example is not limiting, and in other embodiments, other procedures may be used at subroutine block 406.

From a start block, the procedure 1100 advances to block 1102, where a fabricable design generation engine 318 of the design verification system 302 generates a fabricable segmented design based on the proposed segmented design. Multiple techniques exist to convert the proposed segmented design to a fabricable segmented design. For example, the fabricable design generation engine 318 may use paintbrush patterns associated with the fabrication system 316 to generate a fabricable segmented design based on the proposed segmented design. One such technique is described in commonly owned, co-pending U.S. application Ser. No. 16/805,299, filed Feb. 28, 2020, the entire disclosure of which is hereby incorporated by reference herein for all purposes. Other techniques are described in commonly owned, co-pending U.S. application Ser. Nos. 17/036,454 and 17/036,397, both filed Sep. 29, 2020, the entire disclosures of which are hereby incorporated by reference herein for all purposes. If the proposed segmented design is already fabricable, then the fabricable segmented design may be the same as the proposed segmented design.

At block 1104, the performance optimization engine 306 determines a performance loss value based on a performance simulation of the fabricable segmented design. In some embodiments, an operational simulation as described above may be used to determine a performance metric, and a comparison between the performance metric and a desired performance may be used as the performance loss value.

At block 1106, the performance optimization engine 306 determines a fabrication loss value based on a comparison of the fabricable segmented design to the proposed segmented design. In some embodiments, the comparison may include determining differences between the fabricable segmented design and the proposed segmented design. In some embodiments, a count of segments that are different between the fabricable segmented design and the proposed segmented design may be used as the fabrication loss value.

The procedure 1100 then proceeds to an end block and terminates, returning the determined two or more loss values to its caller.

FIG. 12 is a flowchart that illustrates a non-limiting example embodiment of a procedure for creating an updated design specification using a combined loss value according to various aspects of the present disclosure. While the procedure 1200 is an example of a procedure that is suitable for use at subroutine block 412 of the method 400 illustrated and described above, one will note that this example is not limiting, and in other embodiments, other procedures may be used at subroutine block 412.

From a start block, the procedure 1200 advances to block 1202, where the performance optimization engine 306 determines a gradient estimator of the combined loss value, and at block 1204, the performance optimization engine 306 backpropagates the gradient estimator to create the updated design specification. Any suitable estimator for representing the gradient of the combined loss value may be used. In some embodiments, a straight-through estimator may be used. Example embodiments of using a straight-through estimator in optimizing a segmented design are described in commonly owned, co-pending U.S. application Ser. No. 17/036,397, filed Sep. 29, 2020, the disclosure of which has been incorporated by reference herein.

The procedure 1200 then advances to an end block and terminates, returning the updated design specification to its caller.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, causes the computing system to perform actions for creating a fabricable segmented design for a physical device, the actions comprising:
   receiving, by the computing system, a design specification;
   generating, by the computing system, a proposed segmented design based on the design specification;
   determining, by the computing system, two or more loss values based on the proposed segmented design;
   combining, by the computing system, the two or more loss values to create a combined loss value;
   creating, by the computing system, an updated design specification using the combined loss value; and
   repeating the generating, determining, combining, and creating actions until the updated design specification meets one or more loss thresholds;
   wherein determining the two or more loss values based on the proposed segmented design includes:
      generating a fabricable segmented design based on the proposed segmented design;
      determining a performance loss value based on a performance simulation of the fabricable segmented design; and
      determining a fabrication loss value based on a comparison of the fabricable segmented design to the proposed segmented design; and
   wherein repeating the generating, determining, combining, and creating actions until the updated design specification meets one or more loss thresholds includes repeating the generating, determining, combining, and creating actions at least until the fabrication loss value meets a fabrication loss threshold that indicates that the proposed segmented design is fabricable.

2. The non-transitory computer-readable medium of claim 1, wherein creating the updated design specification using the combined loss value includes backpropagating a gradient of the combined loss value to create the updated design specification.

3. The non-transitory computer-readable medium of claim 2, wherein backpropagating the gradient of the combined loss value to create the updated design specification includes determining an estimator for the gradient of the combined loss value.

4. The non-transitory computer-readable medium of claim 1, wherein creating the updated design specification using the combined loss value includes updating the design specification based on a fabricable segmented design created from the proposed segmented design.

5. The non-transitory computer-readable medium of claim 1, wherein repeating the generating, determining, combining, and creating actions includes incrementing an iteration number, and wherein combining the two or more loss values to create the combined loss value includes multiplying at least one of the loss values by a weight determined based on the iteration number.

6. The non-transitory computer-readable medium of claim 1, wherein combining the two or more loss values to create the combined loss value includes multiplying at least one of the loss values by a weight determined based on a function of at least one of the loss values.

7. The non-transitory computer-readable medium of claim 6, wherein the function includes a Euclidean distance between a point defined by at least two of the two or more loss values and an area that represents desired loss values.

8. The non-transitory computer-readable medium of claim 6, wherein the function includes at least one of an integral and a derivative of at least one of the loss values across multiple iterations.

9. The non-transitory computer-readable medium of claim 6, wherein the function includes comparing at least one of the loss values to a loss value threshold.

10. A computer-implemented method for creating a fabricable segmented design for a physical device, the method comprising:
   receiving, by a computing system, a design specification;
   generating, by the computing system, a proposed segmented design based on the design specification;
   determining, by the computing system, two or more loss values based on the proposed segmented design;
   combining, by the computing system, the two or more loss values to create a combined loss value;
   creating, by the computing system, an updated design specification using the combined loss value; and repeating the generating, determining, combining, and creating actions until the updated design specification meets one or more loss thresholds;

wherein determining the two or more loss values based on the proposed segmented design includes:

generating a fabricable segmented design based on the proposed segmented design;

determining a performance loss value based on a performance simulation of the fabricable segmented design; and determining a fabrication loss value based on a comparison of the fabricable segmented design to the proposed segmented design; and wherein repeating the generating, determining, combining, and creating actions until the updated design specification meets one or more loss thresholds includes repeating the generating, determining, combining, and creating actions at least until the fabrication loss value meets a fabrication loss threshold that indicates that the proposed segmented design is fabricable.

11. The method of claim 10, wherein creating the updated design specification using the combined loss value includes backpropagating a gradient of the combined loss value to create the updated design specification.

12. The method of claim 11, wherein backpropagating the gradient of the combined loss value to create the updated design specification includes determining an estimator for the gradient of the combined loss value.

13. The method of claim 10, wherein creating the updated design specification using the combined loss value includes updating the design specification based on a fabricable segmented design created from the proposed segmented design.

14. The method of claim 10, wherein repeating the generating, determining, combining, and creating actions includes incrementing an iteration number, and wherein combining the two or more loss values to create the combined loss value includes multiplying at least one of the loss values by a weight determined based on the iteration number.

15. The method of claim 10, wherein combining the two or more loss values to create the combined loss value includes multiplying at least one of the loss values by a weight determined based on a function of at least one of the loss values.

16. The method of claim 15, wherein the function includes a Euclidean distance between a point defined by at least two of the two or more loss values and an area that represents desired loss values.

17. The method of claim 15, wherein the function includes at least one of an integral and a derivative of at least one of the loss values across multiple iterations.

18. The method of claim 15, wherein the function includes comparing at least one of the loss values to a loss value threshold.

* * * * *